United States Patent [19]

Rabedeau

[11] Patent Number: 5,253,245
[45] Date of Patent: Oct. 12, 1993

[54] OPTICAL DATA STORAGE TRACKING SYSTEM

[75] Inventor: Melbourne E. Rabedeau, Saratoga, Calif.

[73] Assignee: International Business Machines Corporation, Armonk, N.Y.

[21] Appl. No.: 823,520

[22] Filed: Jan. 21, 1992

[51] Int. Cl.$^5$ .................... G11B 7/095; G11B 7/135
[52] U.S. Cl. .................... 369/119; 369/44.21; 369/44.14; 359/210; 359/214
[58] Field of Search ............ 369/100, 112, 119, 44.11, 369/44.14, 44.21, 121, 122, 109, 106, 116; 359/201, 210, 214

[56] References Cited

U.S. PATENT DOCUMENTS

| | | | |
|---|---|---|---|
| 4,223,348 | 9/1980 | Oinoue et al. | 369/112 |
| 4,235,507 | 11/1980 | Kataoka et al. | 369/112 |
| 4,466,088 | 8/1984 | Trethewey | 369/46 |
| 4,564,757 | 1/1986 | LaBudde et al. | 250/239 |
| 4,607,356 | 8/1986 | Bricot et al. | 369/119 |
| 4,716,283 | 12/1987 | Ando | 369/112 |
| 4,744,071 | 5/1988 | Bricot et al. | 369/44 |
| 4,782,474 | 11/1988 | Arai et al. | 369/44.14 |
| 4,885,732 | 12/1989 | Sunagawa et al. | 369/44.23 |
| 4,945,527 | 7/1990 | Sunagawa | 369/44.21 |
| 4,959,824 | 9/1990 | Ueda et al. | 369/112 |
| 4,969,137 | 11/1990 | Sugiyama et al. | 369/32 |
| 5,138,592 | 8/1992 | Fujita | 309/112 |
| 5,199,020 | 3/1993 | Kim et al. | 369/112 |

FOREIGN PATENT DOCUMENTS 56-83850 7/1981 Japan.
2-216625 8/1990 Japan.

*Primary Examiner*—Paul M. Dzierzynski
*Assistant Examiner*—Drew A. Dunn
*Attorney, Agent, or Firm*—Douglas R. Millett

[57] ABSTRACT

An optical data storage system comprises an optical data storage medium, a moveable optical head, and a fixed optical system. The fixed optical system comprises a focussing system and a fine tracking system. The fine tracking system achieves displacement of the beam spot on the optical medium without displacing the central axis of the beam from the aperture of the objective lens in the optical head. A low mass optical head is achieved without loss of light at the objective lens.

14 Claims, 6 Drawing Sheets

OPTICAL DATA STORAGE TRACKING SYSTEM

BACKGROUND OF THE INVENTION

1. Field of the Invention

This invention relates generally to optical data storage systems and more particularly to maintaining the position of the light beam on the data tracks of such systems.

2. Description of the Prior Art

Optical data storage systems typically have an optical disk medium which stores data on concentric or spiral tracks. A fixed optical system (FOS) contains a laser for generating a light beam to be directed to the disk and sensors for detecting a reflected beam from the disk. The data is accessed by positioning a moveable optical head to a position proximate the desired track. The head is moved by a radial linear motor otherwise known as a course tracking actuator.

The optical head contains a rotatable mirror for directing the laser from the FOS to the disk and an objective lens for focussing the beam to the disk. The objective lens is attached to a focus actuator which moves the lens in order to keep the beam properly focussed on the disk. A fine tracking actuator in the optical head moves the rotatable mirror such that the beam of light always remains exactly on the desired track.

Examples of these types of optical systems include U.S. Pat. No. 4,466,088 issued Aug. 14, 1984 to Trethewey; U.S. Pat. No. 4,564,757 issued Jan. 14, 1986 to LaBudde, et al.; U.S. Pat. No. 4,744,071 issued May 10, 1988 to Bricot, et al.; U.S. Pat. No. 4,969,137 issued Nov. 6, 1990 to Sugiyama, et al.; and Japanese patent application JP 56-83850 published Jul. 8, 1981 by Nagashima, et al.

A problem with all of these systems is that both the focus actuator and the fine tracking actuator must be located on the optical head. This greatly increases the total mass of the optical head which in turn slows down the speed with which the course tracking actuator may position the optical head from track to track. The end result is that the optical storage systems have relatively slow access times compared to magnetic data storage systems.

Japanese patent application JP 02-216625 published Aug. 29, 1990 by Maedea, et al. proposes a way to remove the fine tracking actuator from the optical head. A rotatable mirror is positioned in the fixed optical system with a pivot point positioned a distance away from the reflecting point. By moving the mirror, the beam is displaced at the focus lens of the optical head and fine tracking is achieved. A problem with this scheme is that the aperture of the objective lens in the optical head is relatively small and the beam displacements caused by the rotatable mirror cause a large fraction of the beam to miss the aperture of the objective lens. This causes a large variation in the strength of the data signal which can result in misreading of the data.

What is needed is a fine tracking system which is not located on the optical head and which does not cause the beam to miss the aperture of the objective lens.

SUMMARY OF THE INVENTION

An optical data storage system comprises an optical data storage medium, an optical head and a fixed optical system. The optical head contains a first lens located along an optical axis for focussing light to the medium. The fixed optical system comprises a laser for generating a beam of light, a fine tracking system and a second lens. The second lens is located along the optical axis and images light from a first point to a second point proximate the aperture of the first lens. The fine tracking system includes a means for converging light from the laser to a focal point and means for displacing the focal point a distance from the optical axis such that from the perspective of the second lens, the central axis of the beam of light always passes through the first point.

The result is that the location of the focused spot on the optical medium may be controlled by the fine tracking actuator located in the fixed optical optical system without significant light loss. The central axis of the light beam will pass through the aperture of the objective lens even though the spot on the optical medium is displaced.

For a fuller understanding of the nature and advantages of the present invention, reference should be made to the following detailed description taken in conjunction with the accompanying drawings.

DESCRIPTION OF THE PREFERRED EMBODIMENTS

Figure 1:
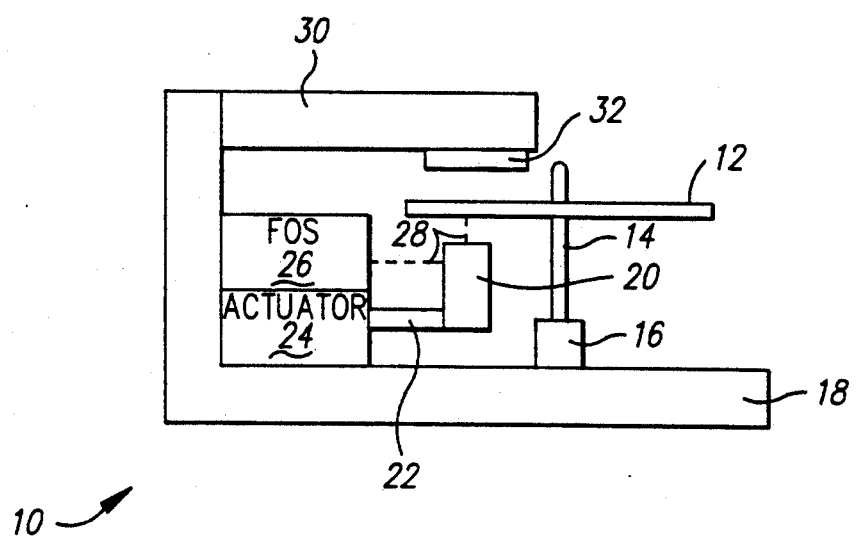
FIG. 1 is a schematic diagram showing an optical data storage system of the present invention.

FIG. 1 shows a schematic diagram of an optical data storage system of the present invention which is designated by the general reference number 10. System 10 includes an optical data storage disk 12, such as a magneto-optic disk. Disk 12 is mounted on a spindle 14 which is attached to a spindle motor 16. Motor 16 is attached to a system chassis 18. Motor 16 rotates spindle 14 and disk 12.

An optical head 20 is positioned below disk 12. Head 20 is attached to an arm 22 which in turn is connected to a linear course tracking actuator 24 such as a voice coil motor. Actuator 24 is attached to chassis 18 and moves arm 22 in a radial direction below disk 12. A fixed optical system (FOS) 26 is attached to chassis 18. A dotted line 28 shows the path of light from the FOS 26 through the optical head 20, to disk 12 and back. A magnet arm 30 is connected to chassis 18 and extends over disk 12. A bias magnet 32 is mounted to arm 30.

Figure 2:
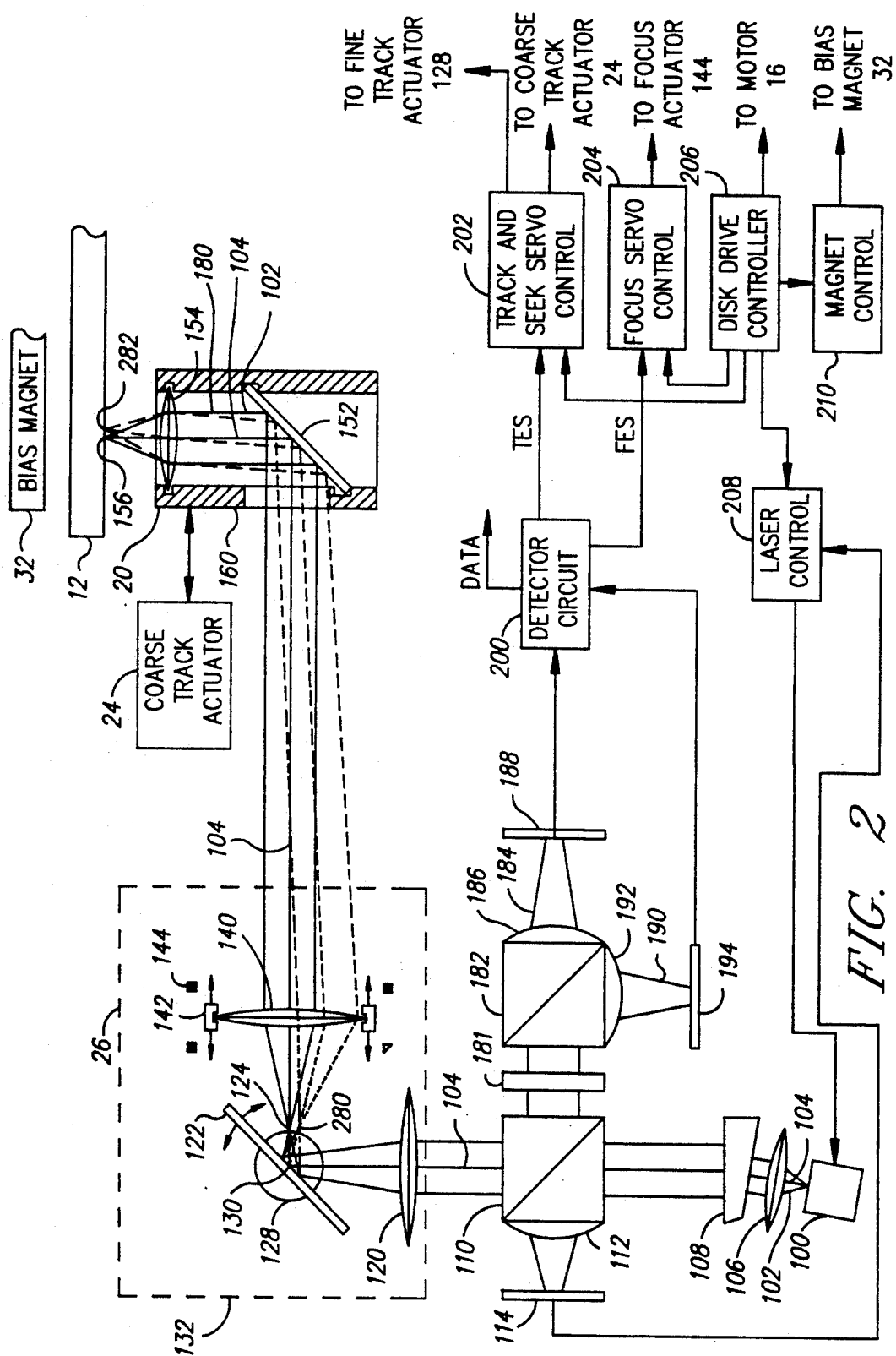
FIG. 2 is a schematic diagram showing a portion of the system of FIG. 1.

FIG. 2 is a schematic diagram of a portion of the system 10 of FIG. 1. The FOS 26 contains a laser 100. Laser 100 is a diode laser such as a gallium aluminum arsenide laser in the preferred embodiment. Laser 100 generates a polarized light beam 102 along an optical axis 104. Beam 102 is polarized parallel to the surface of FIG. 2 and will be referred to as p polarized light, where s and p represent the orthogonal polarization components of light. Beam 102 is collimated by a lens 106 and circularized by a circularizing prism 108. Beam 102 enters a polarization beamsplitter 110. Beamsplitter 110 reflects appropriately 99% of the s polarized light, transmits 70% of the p polarized light and reflects 30% of the p polarized light. Beamsplitter 110 directs 30% of beam 102 through a lens 112 to a power monitor optical detector 114. The remaining portion of beam 102 continues along axis 104 to a focussing lens 120 a first focus means.

Focussing lens 120 is located along optical axis 104 and focuses beam 102 off of a rotatable mirror 122 to a focal point 124 a first focus point. The mirror 122 is attached to a fine tracking actuator 128 which rotates mirror 122 about a pivot point 130 located along axis 104. Actuator 128 may be a stepper motor. In its initial position, mirror 122 is oriented at a 45° angle relative to axis 104 and the beam 102 is reflected at a 90° angle such that focal point 124 lies along axis 104. Lens 120, mirror 122 and actuator 128 comprise a fine tracking system 132.

A lens 140 an imaging means collimates beam 102. Lens 140 is mounted in a lens holder 142. Holder 142 is attached to a focus actuator 144 which moves the lens holder 142 and lens 140 in a direction parallel to axis 104. Actuator 144 may be a voice coil motor. Beam 102 continues along axis 104 to a beam bender mirror 152. Mirror 152 is located at a 45° angle relative to axis 104 and directs beam 102 at a 90° angle along axis 104. An objective lens 154 a second focus means, is located along axis 104 and focuses beam 102 to a spot 156 a second focus point on the disk 12. Spot 156 contains the light from the focal point 124 which has been imaged by the combination of lenses 140 and 154. The mirror 152 and lens 154 are mounted in a support member 160. Mirror 152, lens 154 and member 160 comprise the optical head 20.

A light beam 180 is reflected from the disk 12 and returns along axis 104 through head 20 and FOS 26 until it reaches beamsplitter 110. At beamsplitter 110, 30% of the p polarized light and 99% of the s polarized light of beam 180 is reflected and directed through a half waveplate 181, which rotates at an angle of 45° the polarization components of beam 180. Beam 180 passes to a polarizing beamsplitter 182 which transmits 99% of the p polarized light and reflects 99% of the s polarized light. Beamsplitter 182 divides beam 180 into its orthogonal polarization components (s and p). A beam 184 which contains the p polarized light transmitted by beamsplitter 182 is focussed by a lens 186 to a spot size segmented optical detector 188. A beam 190 which contains s polarized light reflected by beamsplitter 182 is focussed by a lens 192 to an optical detector 194.

Detectors 188 and 194 are connected to a detector circuit 200. Circuit 200 is connected to a track and seek servo control 202 and a focus servo control 204 as are known in the art. A disk drive controller 206 is connected to servo controls 202 and 204, a laser control 208 and a bias magnet control 210. Laser control 208 is connected to laser 100 and detector 114. Magnet control 210 is connected to bias magnet 32. Controller 206, laser control 208 and magnet control 210 are all known in the art.

Figure 3:
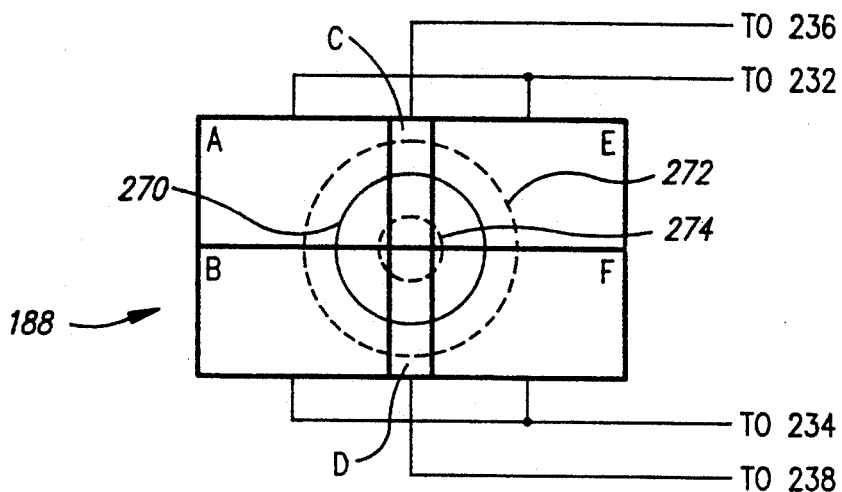
FIG. 3 is a top view of an optical detector of FIG. 2.

FIG. 3 shows a top view of detector 188. The detector 188 is divided into six sections 188A, B, C, D, E and F.

Figure 4:
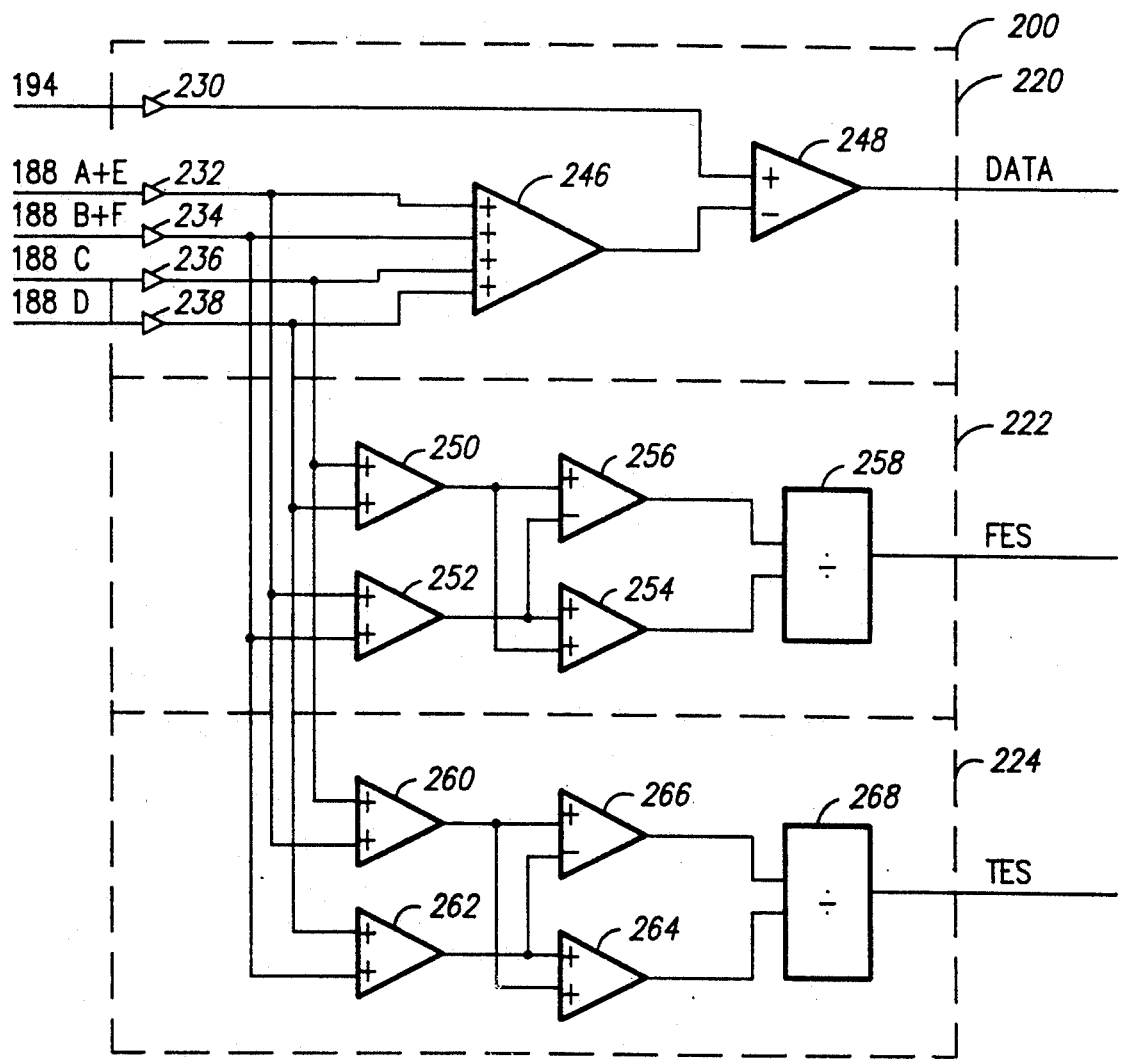
FIG. 4 is a circuit diagram of a detector circuit of FIG. 2.

FIG. 4 shows a circuit diagram of the detector circuit 200. Circuit 200 comprises a data circuit 220, a focus error circuit 222 and a tracking error circuit 224. Data circuit 222 has an amplifier 230 connected to detector 194 and a plurality of amplifiers 232, 234, 236, and 238 connected to optical detector sections 188A and E, B and F, C, and D, respectively. Amplifiers 232-238 are connected to a summing amplifier 246. Amplifiers 230 and 246 are connected to a differential amplifier 248. The output of amplifier 248 is the data signal.

The focus error circuit 222 comprises a plurality of summing amplifiers 250, 252 and 254, a differential amplifier 256, and a division circuit 158. Amplifier 250 is connected to amplifiers 236 and 238. Amplifier 252 is connected to amplifiers 232 and 234. Amplifiers 250 and 252 are connected to differential amplifier 256 and to summing amplifier 254. Amplifiers 254 and 256 are connected to division circuit 258. Division circuit 258 divides the signal from amplifier 256 by the signal from amplifier 254 and outputs a normalized focus error signal (FES).

Tracking error circuit 224 comprises a plurality of summing amplifiers 260, 262 and 264, a differential amplifier 266, and a division circuit 268. Amplifier 260 is connected to amplifiers 232 and 236. Amplifier 262 is connected to amplifiers 234 and 238. Amplifiers 260 and 262 are connected to differential amplifier 266 and summing amplifier 264. Division circuit 268 is connected to amplifiers 264 and 266. Division circuit 268 divides the signal from amplifier 266 by the signal from amplifier 264 and outputs a normalized tracking error signal (TES).

The operation of system of 10 may now be understood. Motor 16 rotates disk 12. When it is desired to write data onto disk 12, controller 206 causes magnet 32 and laser 100 to be turned on. Initially, the whole of disk 12 has its magnetic domain oriented in a first direction (upward for example). Laser 100 produces a write beam 102 which is of sufficient intensity to heat spots on disk 12 to a temperature above the Curie temperature of the medium. At this temperature, the magnetic domains of the spots will align with a downward magnetic field produced by magnet 32. Laser 100 is controlled to provide a pulsed beam 102 representative of the data to be recorded. The data is thus recorded as spots on disk 12 which have a downward magnetic orientation.

During the write operation, reflected beam 180 returns to beamsplitter 182. The beam 180 is divided into the p polarization beam 184 and the s polarization beam 190. See FIG. 3. When beam 102 is exactly focussed on disk 12, beam 182 will have a circular cross-section 270 on detector 188. The sum of the amount of light hitting areas C and D will be approximately equal to the sum of the amount of light hitting areas A, B, E and F, and will cause circuit 222 to output a zero focus error signal. If beam 102 is slightly out of focus one way or the other, beam 182 will fall as a circular cross-section 272 or 274 on detector 188. This will cause circuit 222 to output a positive or negative focus error signal. The focus error signal is used by the focus servo 204 to control motor 144 to move lens 140 until proper focus is again achieved.

If beam 102 is focussed exactly on a track of disk 12, then beam 184 will fall as a circular cross-section 270 equally between sections A, C and E, and the sections B, D and F. If the beam 102 is off track beam 184 will fall more on sections A, C and E, and less on sections B, D and F, or visa versa. This will result in a positive or negative tracking error signal being produced by circuit 224. This tracking error signal is then used by tracking servo 202 to control actuator 128 to rotate mirror 130.

This rotation causes focal point 124 to move. See FIG. 2. Rotating mirror 122 in a clockwise direction causes focal point 124 to shift to a point 280. Beam 102 now follows the path indicated as the dotted line. This shift causes the focus spot on the disk to move to a new point 282 such that the beam remains on track. Note that even though beam 102 is shifted it still passes through the center aperture of lens 154. This is described in more detail below.

When it is desired to erase data which has already been recorded, laser 100 produces a continuous beam 102 which is of sufficient power to heat a section of the media to above its Curie temperature. Magnet 32 is simultaneously controlled to output an upward magnetic field such that the section which has just been heated with the laser beam returns to its original upward magnetic orientation. The erased section is now available to be written upon once again.

When it is desired to read data recorded on the disk, laser 100 is energized to produce a read beam 102. Read beam 102 is of low enough intensity such that disk 12 is not heated above its Curie temperature. The beam 102 is focussed by lens 154 to disk 12. The data has already been recorded on the medium as up or down oriented magnetic domains. Light reflected from the medium has its plane of polarization rotated one way or the other depending on the orientation of the magnetic domains. This is known as the Kerr effect. The reflected beam 180 returns and is divided into beams 184 and 190 at beamsplitter 182. The s polarization component beam 190 is detected by detector 194 and the p polarization component beam 184 is detected by detector 188. Circuit 220 compares the intensity of the two beams and outputs a data signal which is representative of the data recorded on disk 12.

Figure 5:
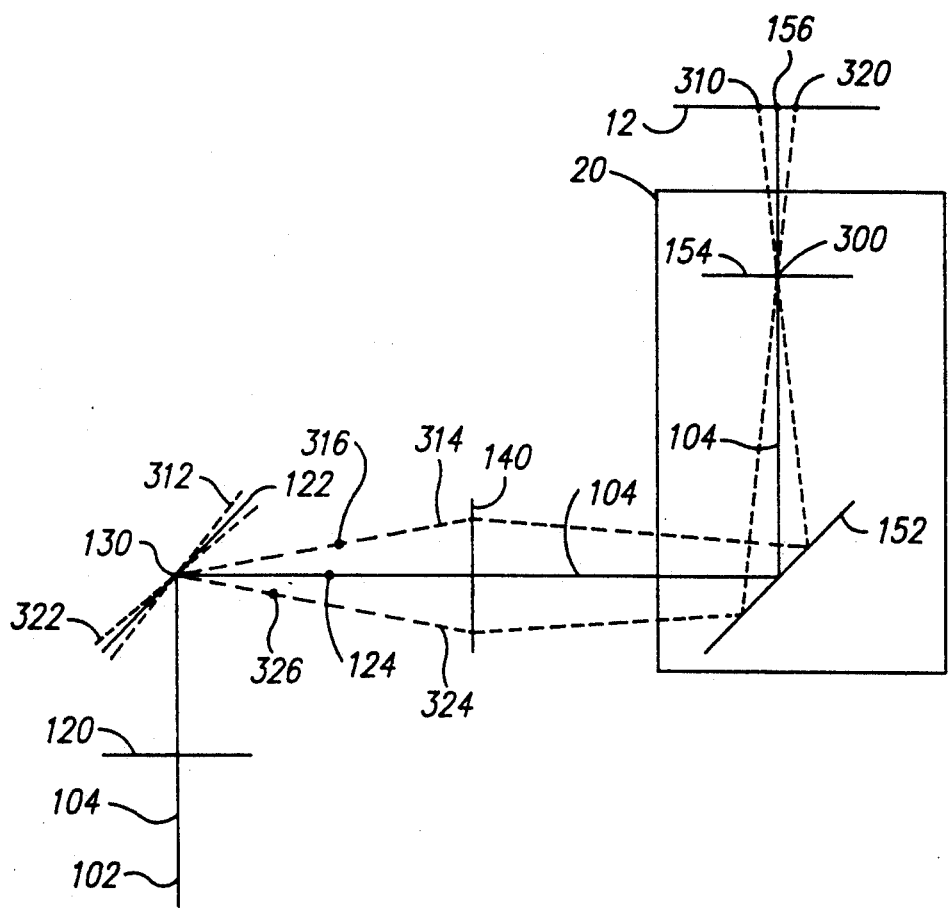
FIG. 5 is a schematic diagram showing the operation of the fine tracking system of the present invention.

FIG. 5 shows a schematic diagram of a portion of system 10 which illustrates the operation of the fine tracking system of the present invention. Objective lens 154 has an aperture located at a point 300 along axis 104. Lens 140 is selected and the distance is set such that light from point 130, a first image point, is imaged by lens 140 to point 300, a second image point. For this to occur the equation $1/f_{140} = 1/d_1 + 1/d_2$ must be satisfied, where $f_{140}$ is the focal length of lens 140, $d_1$ is the distance along axis 104 between point 130 and lens 140, and $d_2$ is the distance along axis 104 between lens 140 and point 300.

In a preferred embodiment $f_{140}$ equals 10 mm, $d_1$ equals 11.43 mm and $d_2$ equals 80 mm. Also in a preferred embodiment, the lens 120 has a focal length of 10 mm and lens 154 has a focal length of 4 mm.

During operation of the optical system, it is necessary to slightly shift spot 156 in a radial direction along disk 12 in order to follow the data track. This fine tracking is accomplished by rotating mirror 122. If it is desired to move spot 156 to a point 310, then mirror 22 is rotated counter-clockwise to a position 312 (shown by a dotted line). This will cause beam 102 to be diverted along an axis 314 (shown by a dotted line). The focal point 124 is now shifted to point 316, which in turn causes spot 156 to move to point 310 at the disk 12.

Similarly, if it is desired to move spot 156 to a point 320, then mirror 122 is rotated clockwise to a position 322 (shown by a dotted line). This causes beam 102 to be diverted along an axis 324 (shown by a dotted line). The focal point 124 is now shifted to a point 326, which in turn causes spot 156 to move to point 320 at the disk 12.

Note that in both cases, axes 314 and 324 pass through point 300 (the aperture of lens 154). Thus, fine tracking is achieved at a distance removed from the optical head 20 without loss of light at the entrance aperture of the objective lens 154. In addition, the present invention is also able to remove the focus actuator from the optical head. The focus actuator of the present invention moves lens 140 located in the fixed optical system 26 rather than lens 154 of the optical head 20.

It should be noted that the movement of lens 140 by the focus actuator 144 and the movement of head 20 by the course tracking actuator 24 will cause point 300 to be shifted slightly away from lens 154 along axis 104. However, the shift is not great enough to cause the light beam 102 to miss the aperture of lens 154. This shift may be further reduced by positioning point 300 at lens 154 when both the focus actuator 144 and the course tracking actuator 24 are at the midpoint of their respective travel ranges.

Figure 6:
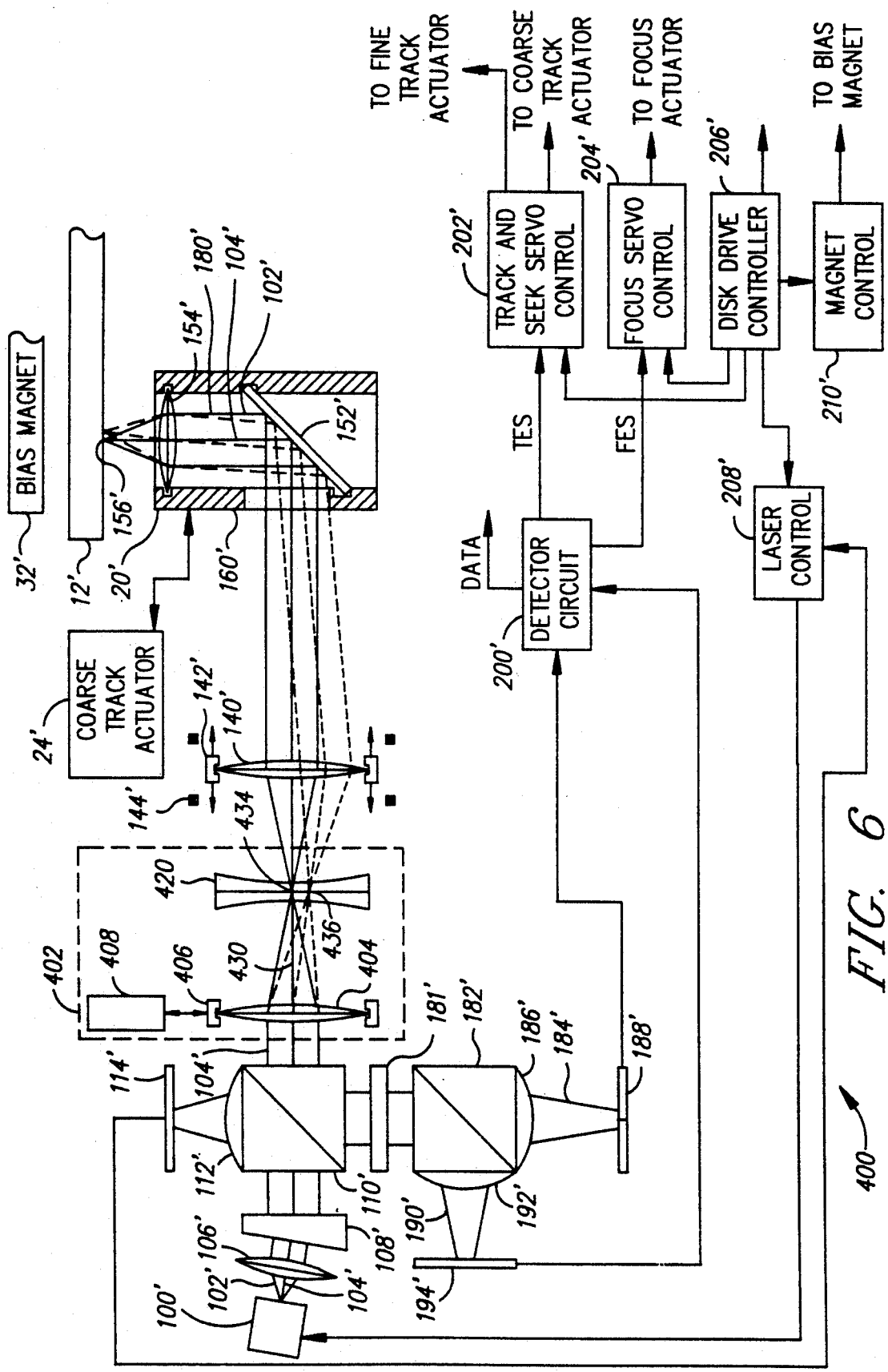
FIG. 6 is a schematic diagram showing an alternative embodiment of the optical data storage system of the present invention.

FIG. 6 shows a schematic diagram of an alternative embodiment of the data storage system of the present invention and is designated by the general reference number 400. Elements of system 400 which are similar to elements of system 10 are designated by a prime number. The fine tracking system 132 of FIG. 2 is replaced by a fine tracking system 402.

Fine tracking system 402 includes a focussing lens 404, a first focus means located along axis 104' and mounted in a lens holder 406. Holder 406 is attached to a fine tracking actuator 408 which moves holder 406 and lens 404 in a direction orthogonal to axis 104'. Actuator 408 may be a voice coil motor. A negative lens 420 is located along axis 104' between lens 404 and lens 140'.

The operation of system 400 is similar to that described above for system 10, with the exception of the operation of fine tracking system 402.

Figure 7:
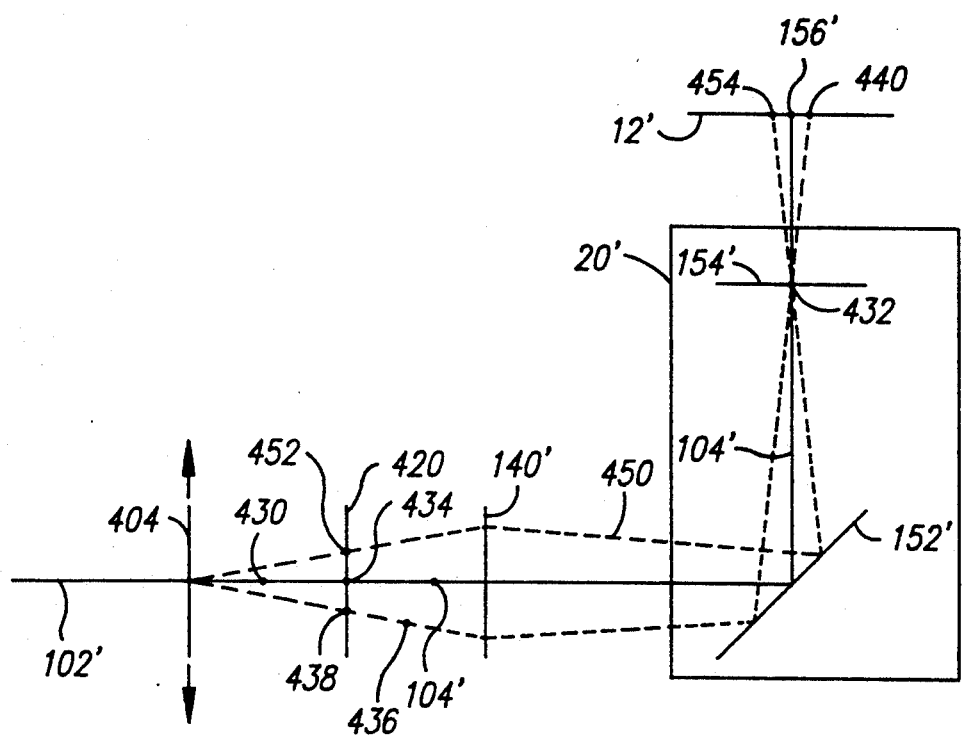
FIG. 7 is a schematic diagram showing the operation of the fine tracking system of FIG. 6.

FIG. 7 shows a schematic diagram of a portion of system 400. A point 430 lies along axis 104' and is imaged by lenses 420 and 140' to a point 432. Point 432 lies at the aperture of lens 154', a second focus means. Lens 404 focuses beam 102' to a focal point 434, a first focus point. Negative lens 420 is positioned at point 434.

When it is desired to adjust the fine tracking position of spot 156', a second focus point on disk 12', lens 404 is moved up or down relative to axis 104'. If lens 404 is moved downward, light beam 102' is directed along an axis 436 and focal point 434 shifts to a point 438. Lens 140' and lens 154' image the light at point 438 to a point 440 on disk 12'. If lens 404 is moved upward, light beam 102' is directed along an axis 450 and focal point 434 shifts to a point 452. Lens 140' and lens 154' image the light at point 452 to a point 454 on disk 12'.

Negative lens 420 is needed to re-direct the light beam 102' such that from the perspective of lens 140', the central axis of the light always appears to be coming from point 430, a first image point. This will cause lens 140', an imaging means, to image the central axis of the light through point 432, a second image point at the aperture of lens 154'. Theoretically, negative lens 420 could be eliminated by locating lens 404 exactly at point 430. However, lens 404 would have to have an impractically short focal length.

The negative lens must satisfy the following equation
$f_{420} = [(f_{404} \times f_{140}^2)/d_2 - f_{140})]/[f_{404} - f_{140}^2/(d_2 - f_{140})]$
where $f_{420}$ is the focal length of lens 420, $f_{140}$ is the focal length of lens 140', $f_{404}$ is the focal length of lens 404, and $d_2$ is the distance along axis 104' between lens 140' and point 432.

In a preferred embodiment, lens 404 has a focal length of 10 mm, lens 420 has a focal length of negative 1.67 mm and lens 140' has a focal length of 10 mm. Lens 140' is located 80 mm along axis 104' from point 432.

The advantages of the present invention may now be understood. The fine tracking actuator and the focus tracking actuator are removed from the optical head. This enables the optical storage system to achieve much faster access times. In addition, fine tracking is achieved without displacing the beam from the aperture of the objective lens.

Other embodiments of the present invention are also possible. Although the present invention has been illustrated using a magneto-optic type of optical media system, other media systems such as read only memory (ROM), write once read many (WORM), or phase change media, etc., may also be used. Also, other optical elements such as holograms may be substituted for the lenses.

While the preferred embodiments of the present invention have been illustrated in detail, it should be apparent that modification and adaptations to those embodiments may occur to one skilled in the art without departing from the spirit and scope of the present invention as set forth in the following claims.

I claim:

1. An optical data storage system comprising:
   an optical medium;
   a means for generating a radiation beam;
   a first focus means for focussing the radiation beam to a first focus point;
   a second focus means for focussing the radiation beam from the first focus point to a second focus point on the optical medium;
   a mirror rotatable about a pivot line located between the first focus means and the first focus point, the rotatable mirror for displacing the second focus point on the optical medium;
   a rotation means attached to the mirror for rotating the mirror about the pivot line; and
   an imaging means located between the rotatable mirror and the second focus means for imaging radiation from a first image point proximate the pivot line to a second image point proximate the aperture of the second focus means, such that the beam passes through the second focus means aperture as the second focus point on the medium is displaced.

2. The system of claim 1, further comprising:
   an optical head moveable relative to the medium, the head comprising the second focus means and a second mirror.

3. The system of claim 1, further comprising:
   optical reception means for receiving a reflected radiation beam from the medium and generating a data signal responsive thereto.

4. The system of claim 1, furthering comprising:
   optical reception means for receiving a reflected radiation beam from the medium and including means for generating a tracking error signal for controlling the rotation means.

5. The system of claim 1, wherein the imaging means comprises an imaging convex lens.

6. The system of claim 5, wherein $1/f_{140} = 1/d_1 + 1/d_2$, where $f_{140}$ is the focal length of the imaging lens, $d_1$ is the distance between the first image point and the imaging lens, and $d_2$ is the distance between the imaging lens and the second image point.

7. The system of claim 5, further comprising:
   a movement means attached to the imaging lens for moving the imaging lens in a direction substantially parallel to the radiation beam; and
   an optical reception means for receiving a reflected radiation beam from the medium and including means for generating a focus error signal for controlling the movement of the movement means.

8. An optical data storage system comprising:
   an optical medium;
   a means for generating a radiation beam;
   a first focus means for focussing the radiation beam to a first focus point;
   a second focus means for focussing the radiation from the first focus point to a second focus point on the optical medium;
   a first movement means attached to the first focus means for moving the first focus means in a direction substantially perpendicular to the radiation beam in order to displace the second focus point on the medium; and
   an imaging means located between first focus means and the second focus means for imaging radiation from a first image point to a second image point, the first image point located between the first focus means and the imaging means and the second image point located proximate the aperture of the second focus means, such that the radiation beam passes through the second focus means aperture as the second focus point on the medium is displaced.

9. The system of claim 8, further comprising:
   an optical head moveable relative to the medium, the head comprising the second focus means and a mirror.

10. The system of claim 8, further comprising:
    optical reception means for receiving a reflected radiation beam from the medium and generating a data signal responsive thereto.

11. The system of claim 8, further comprising:
    optical reception means for receiving a reflected radiation beam from the medium and including means for generating a tracking error signal for controlling the first movement means.

12. The system of claim 8, wherein the imaging means comprises a negative lens and a convex lens.

13. The system of claim 12, wherein $$f_{420} = [(f_{404} \times f_{140}^2)/(d_2 - f_{140})]/[f_{404} - f_{140}^2/(d_2 - f_{140})],$$

where $f_{420}$ is the focal length of the negative lens, $f_{140}$ is the focal length of the convex lens, $f_{404}$ is the focal length of the first focus means, and $d_2$ is the distance between the convex lens and the second image point.

14. The system of claim 12, further comprising:
    a second movement means attached to the convex lens for moving the convex lens in a direction substantially parallel to the radiation beam; and
    an optical reception means for receiving a reflected radiation beam from the medium and including means for generating a focus error signal for controlling the movement of the second movement means.

* * * * *

UNITED STATES PATENT AND TRADEMARK OFFICE
CERTIFICATE OF CORRECTION

PATENT NO. : 5,253,245
DATED : Oct. 12, 1993
INVENTOR(S) : M. Rabedeau

It is certified that error appears in the above-identified patent and that said Letters Patent is hereby corrected as shown below:

Column 2, line 13, after "in the fixed" omit the word [optical]

Column 6, line 64, after "$[(f_{404} \times f_{140}^2)/$" add --(--

Signed and Sealed this

Thirty-first Day of May, 1994

Attest:

BRUCE LEHMAN

Attesting Officer     Commissioner of Patents and Trademarks